United States Patent
Roffman et al.

(10) Patent No.: US 7,370,962 B2
(45) Date of Patent: May 13, 2008

(54) PUPIL REGULATED MULTIFOCAL CONTACT LENSES

(75) Inventors: Jeffrey H. Roffman, Jacksonville, FL (US); Ganesh Kumar, Jacksonville, FL (US); Philippe Jubin, Jacksonville, FL (US); Timothy R. Poling, Jacksonville, FL (US); Michel Guillon, London (GB)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 197 days.

(21) Appl. No.: 10/285,054

(22) Filed: Oct. 31, 2002

(65) Prior Publication Data

US 2004/0085515 A1    May 6, 2004

(51) Int. Cl.
*G02C 7/04* (2006.01)

(52) U.S. Cl. .................. 351/161; 351/160 R; 351/169; 351/168

(58) Field of Classification Search ................ 351/159, 351/160 R, 161, 164, 168–69, 176–77
See application file for complete search history.

(56) References Cited

U.S. PATENT DOCUMENTS

| 4,580,882 A | 4/1986 | Nuchman et al. ........... 351/161 |
| 4,861,152 A | 8/1989 | Vinzia et al. ............... 351/161 |
| 4,976,534 A | 12/1990 | Miege et al. ............... 351/161 |
| 5,530,491 A | 6/1996 | Baude et al. ............... 351/161 |
| 5,574,518 A * | 11/1996 | Mercure ...................... 351/161 |
| 5,754,270 A | 5/1998 | Rehse et al. ................ 351/161 |
| 5,864,379 A | 1/1999 | Dunn .......................... 351/161 |
| 6,030,077 A | 2/2000 | Sawano et al. ............. 351/161 |
| 6,116,735 A * | 9/2000 | Wada .......................... 351/161 |
| 6,142,625 A | 11/2000 | Sawano et al. ............. 351/161 |
| 6,260,966 B1 | 7/2001 | Sawano et al. ............. 351/161 |
| 6,322,213 B1 | 11/2001 | Altieri et al. ............... 351/161 |
| 6,685,315 B1 * | 2/2004 | De Carle .................... 351/161 |
| 2004/0021824 A1 * | 2/2004 | Ye et al. ..................... 351/161 |

FOREIGN PATENT DOCUMENTS

| WO | WO 95/26518 A1 | 10/1995 |
| WO | WO 96/08745 A1 | 3/1996 |
| WO | WO 02/21194 A2 | 3/2002 |
| WO | WO 03/016985 A2 | 2/2003 |

OTHER PUBLICATIONS

PCT International Search Report, dated Mar. 24, 2004, for PCT Int'l. Appln. No. PCT/US03/33277.
U.S. Appl. No. 10/284,702, Roffman et al.
U.S. Appl. No. 10/284,613, Roffman et al.

* cited by examiner

*Primary Examiner*—Jessica T Stultz
(74) *Attorney, Agent, or Firm*—Lois Gianneschi

(57) ABSTRACT

The invention provides a multifocal ophthalmic lens that both corrects for the wearer's refractive prescription and takes into account pupil size of a specific individual or of a population of individuals. The invention provides a lens having an optic zone having a substantially circular central zone containing over-refracted near vision power and a diameter of about 2.5 mm or less.

7 Claims, 3 Drawing Sheets

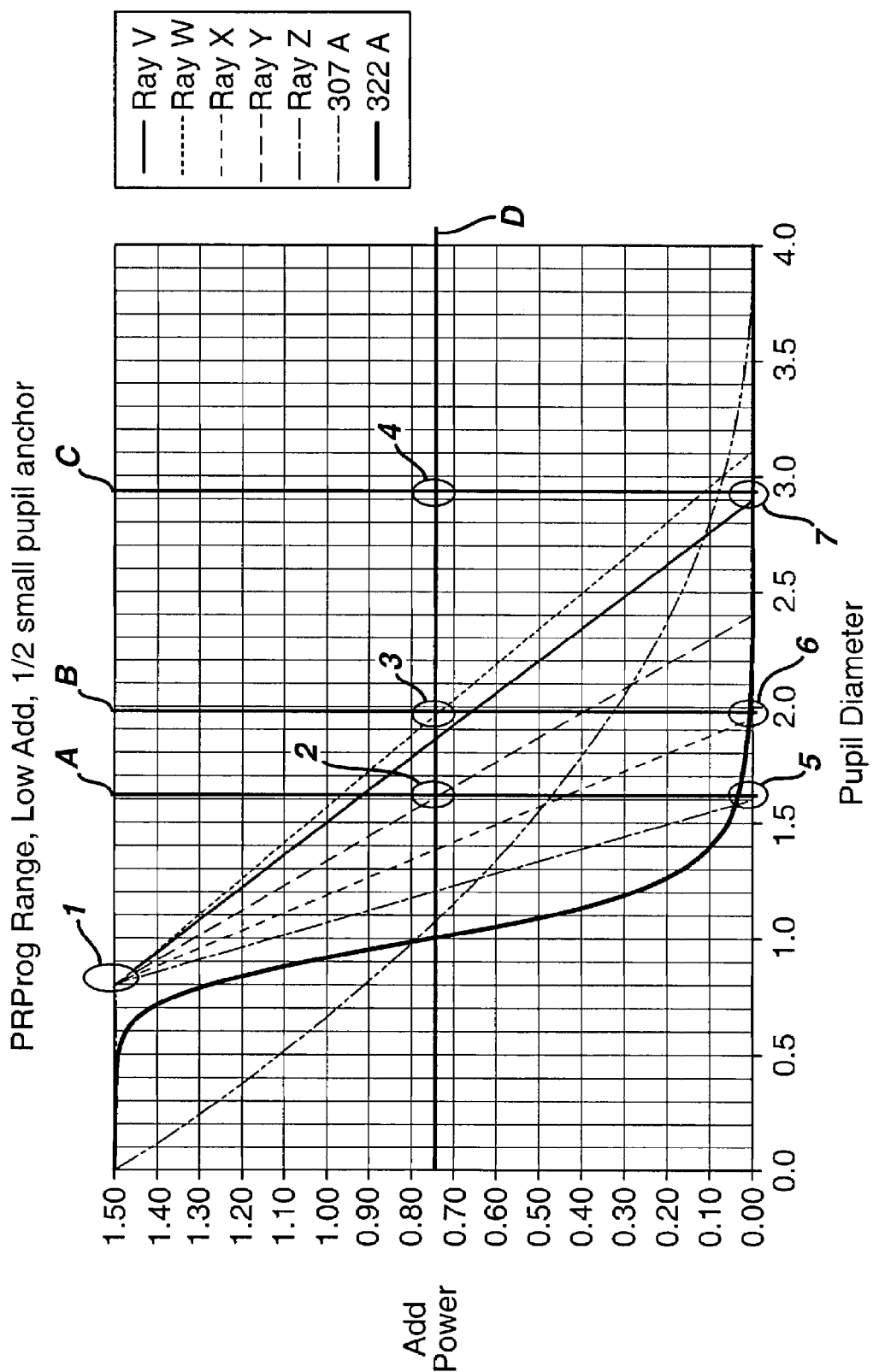

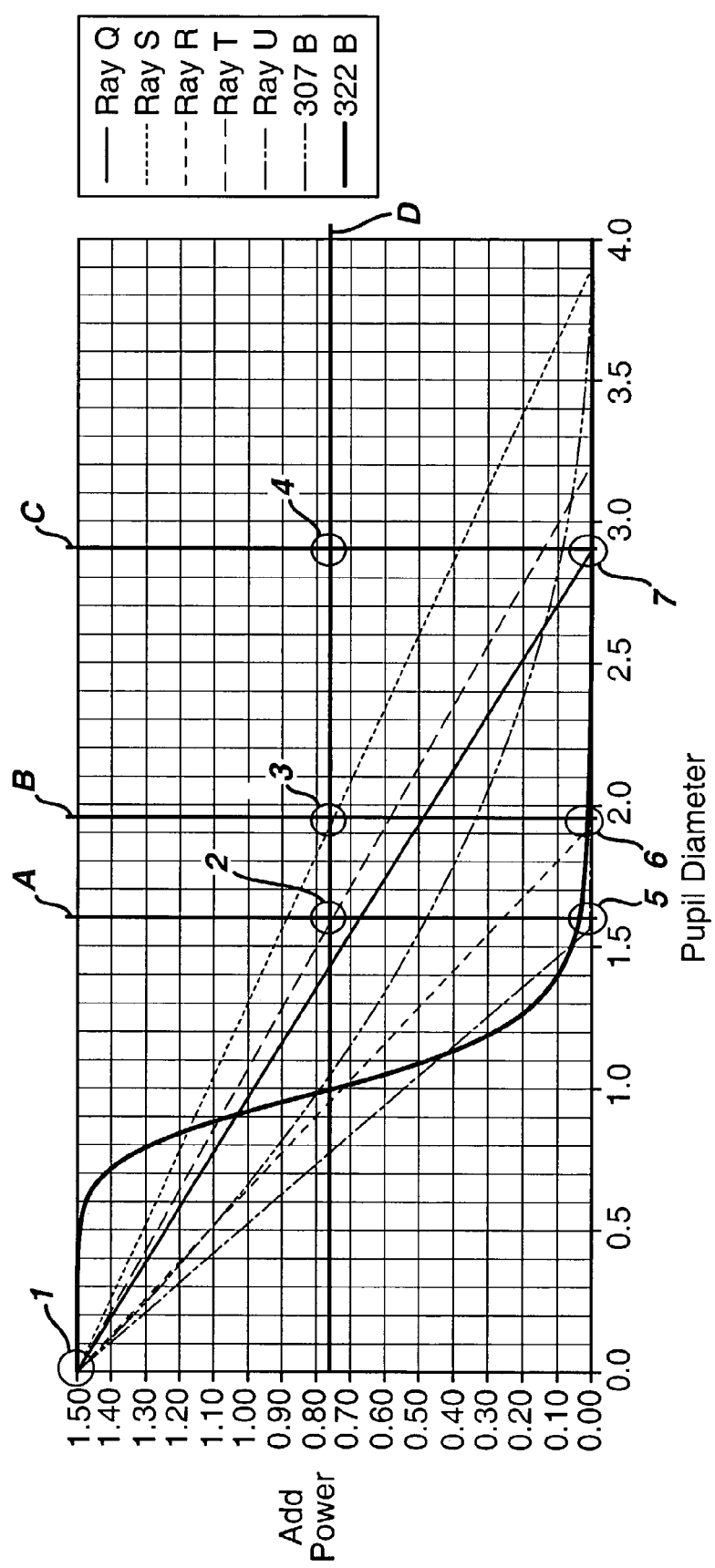

PUPIL REGULATED MULTIFOCAL CONTACT LENSES

FIELD OF THE INVENTION

The invention relates to multifocal ophthalmic lenses. In particular, the invention provides contact lenses that provide correction for presbyopia by taking into account both the wearer's refractive prescription and pupil size.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is absent.

Among the methods used to correct for the eye's failure to accommodate are lenses that have more than one optical power. In particular, contact and intraocular lenses have been developed in which zones of distance, near, and intermediate power are provided.

Additionally, it is known that an individual's pupil size varies with age, luminance, and refractive prescription. For example, as luminance increases, pupil size decreases while, as a person ages, the pupil's response to changes in illumination diminishes. For individuals with presbyopia that is corrected with low add power, for example 1.50 diopters of add power or less, the pupil size will be larger than those requiring greater add power. The reason is that, in general, those requiring less add power are younger in age and have larger pupil sizes at a given luminance than does an older individual.

Conventional lenses typically do not account for pupil size and, thus, are less efficient in distributing light to the lens wearer in all viewing conditions. This results in suboptimal vision. Therefore, a need exists for a lens the design of which takes into account pupil size.

BRIEF DESCRIPTION OF THE DRAWINGS

FIG. 2 depicts power progressions that may be used in lenses of the invention.
FIG. 3 depicts additional power progressions that may be used in lenses of the invention.

DETAILED DESCRIPTION OF THE INVENTION AND PREFERRED EMBODIMENTS

Figure 1:
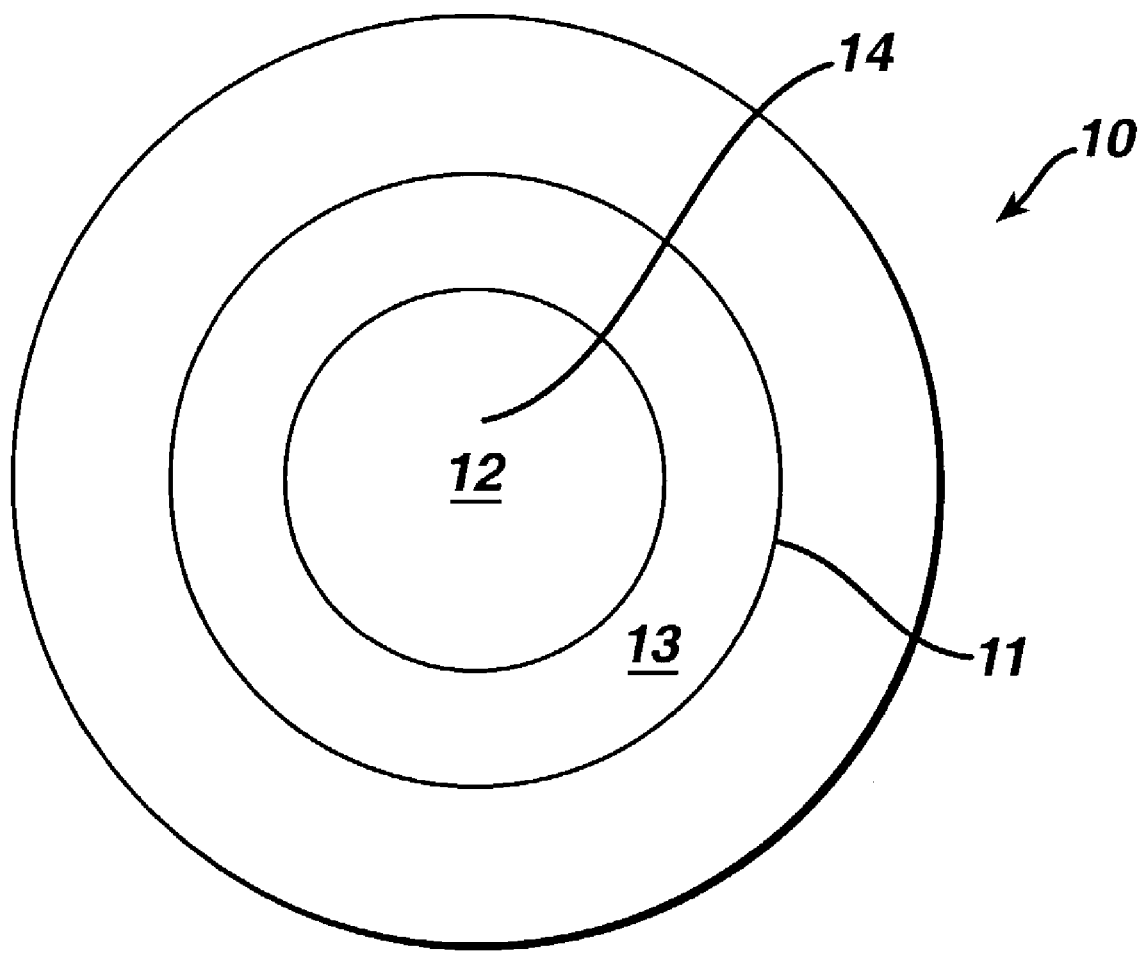
FIG. 1 depicts a lens of the invention.

The invention provides a multifocal ophthalmic lens, and methods for producing the lens, which lens both corrects for the wearer's refractive prescription and takes into account pupil size. In one embodiment, the invention provides an ophthalmic lens, comprising, consisting essentially of, and consisting of an optic zone having a substantially rotationally symmetric central zone comprising, consisting essentially of, or consisting of progressive addition power, wherein a diameter of the central zone is determined by a lens wearer's pupil diameter measured at at least a first and a second luminance.

In another embodiment, the invention provides an ophthalmic lens comprising, consisting essentially of, and consisting of a an optic having a substantially rotationally symmetric central zone comprising, consisting essentially of, and consisting of progressive addition power, wherein a diameter of the central zone is about 2.5 mm or less. In the lenses of the invention, the central zone may be on the front surface, or object side surface, or the back surface, or eye side surface of the lens.

By "ophthalmic lens" is meant a contact lens, an intraocular lens, a corneal implant lens, an onlay lens, and the like, or combinations thereof. Preferably, the lenses of the invention are contact or intraocular lenses.

In FIG. 1 is shown lens 10 of the invention with optic zone 11 having central zone 12 and outer zone 13. Central zone 12, a zone of progressive addition power, at its innermost point 14 has near vision power, or that power necessary to correct the wearer's near vision acuity. As one moves radially outward from point 14 to the periphery of central zone 12, the power continuously and progressively changes from near through intermediate vision power until outer zone 13 is reached at which point there is only distance vision power, or that power necessary to correct the wearer's distance vision acuity.

In the first step of the invention, the basic refractive prescription of the lens wearer is measured by any conventional method. By "basic refractive prescription" is meant one or more of the distance vision, near vision, intermediate vision, cylinder power and prismatic power necessary to correct the lens wearer's vision. Preferably, in the lenses of the invention, the near and distance vision power provided is that amount necessary to correct for visual acuity. Subsequently, and preferably, an over-refraction is performed to verify that the expected power was achieved by the lens, or whether the power needs to be altered.

The distance vision power, or sphere power, required to correct the wearer's distance vision is determined by measuring the distance vision acuity and determining the distance power required to correct the acuity. The near vision power is also measured. The near vision power is the wearer's distance sphere power plus the add power, or power in addition the distance vision power, necessary to correct the lens wearer's near vision acuity. A surface of the lens is designed, using conventional optic design techniques, to provide correction for the wearer's visual acuity.

It is known that the diffraction limited pupil diameter for an adult is about 2 mm. At that point, the eye acts as a pinhole camera producing a clear, sharp image of objects viewed over a wide range of distances. It is a discovery of the invention that, by placing near vision correction in the center, or central zone, of the optic zone and maintaining a diameter of preferably about 2.5 mm or less for that central zone, the depth of field experienced at the diffraction limited pupil diameter may be replicated in the lens of the invention.

The size of the central zone for a lens designed in accordance with the invention will be determined based upon the lens wearer's pupil diameter viewed at at least two different luminance levels. The measured pupil diameter may be an actual measurement of an individual's pupil or mean diameters based on measurements of a population of individuals. Preferably, the pupil is measured at low, intermediate and high luminance, which correspond to 2.5 cd/m$^2$, 50 cd/m$^2$, 250 cd/m$^2$, respectively, using any suitable instrument, such as a pupillometer. Alternatively, the central zone diameter is based on available data of pupil size as a function of age, add power, or both. Pupil size data is available from a number of sources including, without limitation, U.S. Pat. Nos. 5,488,312, 5,682,223, 5,835,192, and 5,929,969 incorporated herein in their entireties.

In designing the lenses of the invention, the progression from near to far distance vision power also must be determined. In a preferred method, the power progression is determined as follows. The pupil diameter for an individual is measured and graphed as shown in FIG. 2. In FIG. 2, the vertical lines A, B, and C correspond to high, medium, and low luminance pupil diameters. Horizontal line D is a line at ½ of the add power to be used in the lens. Point 1 is identified, which point is at the full add power and ½ of the high luminance pupil diameter. Additional points 2, 3, and 4 are identified, which points are at ½ of the add power at high, medium, and low luminance pupil diameters, respectively. Finally, point 5, 6, and 7 are identified, which are at 0 add power and at high, medium, and low luminance pupil diameters, respectively.

Rays V, X, and Z are drawn from point 1 through points 7, 6, and 5, respectively. Rays W and Y are drawn from point 1 through points 3 and 2, respectively. It was experimentally determined that the progressive power distribution that was most accepted substantially followed the slope of Ray Z. This progression is shown as trace 322A in FIG. 2. Acceptance may be determined by any conventional method. For example, clinical testing may be carried out for high luminance, high contrast visual acuity along with acuity at different chart luminances and letter contrasts. Such testing may be augmented with subjective responses of the individual to questioning.

In FIG. 3 is depicted another embodiment in which point 1 is at full add power and at zero pupil diameter, which embodiment is less preferred than that of FIG. 2. The FIG. 2 embodiment allows for a near vision power zone of substantially similar power over a finite area and not only at a point, as in the FIG. 3 embodiment. In the FIG. 3 embodiment, the most accepted power distribution is one that lies substantially between Ray S and Ray U. The most accepted distribution typically will be within an envelope formed by a summing of the rays.

In the lenses of the invention, there is a power progression across the optic zone of the lens from near to distance vision, from the center of optic zone to its periphery. Thus, the lens will have an instantaneous and average power. The average power will be less than the instantaneous power and, thus, the near vision power and distance power may need to be greater than that required to correct the wearer's visual acuity. For example, for the lens wearer to obtain the effect of a +1.25 add power, it may be necessary for the central zone of the optic zone to provide +2.50 diopters of add power. Thus, the lenses of the invention preferably have over-refracted near and distance vision power, or power in addition to that measured as necessary to correct the wearer's near vision acuity.

The back, or eye side, surface of the lens is also determined. For wearer's without astigmatism, only spherical power is needed for the back surface. In those cases in which the wearer has astigmatism, the back surface, front surface, or both include cylinder power for correction of the astigmatism.

Alternatively, the optic zone of the back surface may be more rigid than the remainder of the lens in order to neutralize corneal astigmatism. This method permits use of a spherical back surface. In this embodiment, the rigid portion must be sufficiently rigid so that the lens substantially does not conform to the corneal shape. Preferably, the rigid portion is substantially circular in shape and has a diameter of less than about 8 mm, more preferably less than about 6 mm. Such a rigid back portion also will alleviate the need for rotational stabilization of the lens on-eye. The optic zone may be made rigid by any number of methods including, without limitation, embedding a rigid member into the lens, use of selective curing methods, grafting a rigid to a soft material and the like and combinations thereof.

Cylinder power may be provided on the back, or concave surface of the lens in order to correct the wearer's astigmatism. Alternatively, the cylinder power may be combined with either or both of the distance and near vision powers, or progressive addition power, on the front surface or back surface. In all of the lenses of the invention, the distance, intermediate and near optical powers may be spherical or aspheric powers. Additionally, the distance power zone may be of any desired and practicable dimensions.

Contact lenses useful in the invention may be soft lenses or soft lenses with a rigid portion attached thereto or implanted therein. Soft contact lenses, made of any material suitable for producing such lenses, preferably are used. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Ser. No. 60/363,630 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

The contact lenses of the invention may be formed by any conventional method. For example, the optic zone may be produced by diamond-turning or diamond-turned into the molds that are used to form the lens of the invention. Subsequently, a suitable liquid resin is placed between the molds followed by compression and curing of the resin to form the lenses of the invention. Alternatively, the zone may be diamond-turned into lens buttons.

In embodiments in which there is a rigid structure in the lens, suitable materials for use in forming the structure include rigid, or hard, lens polymers used in manufacturing contact lenses including, without limitation, siloxane polymers, acrylates such as polymethylmethacrylate, cellulosic polymers, carbonates, silicone acrylates, fluoroacrylates, perfluorinated polyethers, alkyl substituted acetylenes, and the like, and copolymers thereof. Alternatively, the structure may be made from a soft contact lens material having a modulus higher than that of the material used to form the lens in which the structure is embedded.

Preferably, the rigid structure is embedded within the bulk of the lens material to ensure wearer comfort. The structure may be introduced into the lens material by any convenient method. For example, the structure to be embedded may be first formed and then surrounded by lens material by inserting the structure into a contact lens mold half into which lens material is then dispensed, introducing the other mold half, and curing the mold assembly. As another example, lens material may be dispensed into a mold half and partially cured followed by inserting the embedded structure onto the partially cured lens material, dispensing additional lens material, introducing the second mold half, and curing the mold assembly.

What is claimed is:

1. A hybrid contact lens, having a (a.) front surface comprising a first optic zone having a substantially rotationally symmetric central zone at the center thereof, the central zone having a diameter and comprising progressive addition power wherein the power continuously and progressively changes from near through intermediate to distance vision power from the center of the central zone to its periphery and, wherein a diameter of the central zone is determined by a lens wearer's pupil diameter measured at at least a first and a second luminance and (b.) a back surface comprising a second optic zone that is substantially circular and rigid.

2. The lens of claim 1, wherein the diameter of the central zone is about 2.5 mm or less.

3. The lens of claim 1, wherein the front surface further comprises cylinder power.

4. The lens of claim 1, wherein the back surface comprises cylinder power.

5. The lens of claim 2, wherein the back surface further comprises cylinder power.

6. The lens of claim 2, wherein the front surface comprises cylinder power.

7. The lens of claim 1, wherein the optic zone on the front surface of the lens further comprises at least one distance vision power zone that is an annular zone that surrounds the central zone.

* * * * *